United States Patent
Fix

[15] 3,656,360
[45] Apr. 18, 1972

[54] POLYURETHANE BELTS

[72] Inventor: Sidney R. Fix, Lincoln, Nebr.

[73] Assignee: The Goodyear Tire & Rubber Company, Akron, Ohio

[22] Filed: Jan. 17, 1969

[21] Appl. No.: 805,925

Related U.S. Application Data

[63] Continuation-in-part of Ser. No. 722,917, Apr. 22, 1968, abandoned.

[52] U.S. Cl. .................. 74/234, 74/237, 156/140, 156/169, 156/179, 156/245, 156/286, 161/133, 161/144, 161/190, 264/102, 264/310, 264/331
[51] Int. Cl. ........................................................ F16g 5/14
[58] Field of Search ............................................. 260/859; 74/231–234, 237; 161/144, 190, 189, 133, 112; 264/299, 331, 102, 310; 156/137–140, 8, 140, 169, 179, 245, 286; 198/193

[56] References Cited

UNITED STATES PATENTS 3,200,662  8/1965  Rockoff et al. ................. 161/144
3,227,596  1/1966  Knowles ........................ 161/144

*Primary Examiner*—William A. Powell
*Attorney*—F. W. Brunner and Ronald P. Yaist

[57] ABSTRACT

A cured polyurethane composition prepared by mixing a particulate polyfluorohydrocarbon resin with a liquid polyurethane prepolymer and curing the said prepolymer with a curing agent. The cured polyurethane composition has utility in power transmission belts and particularly power transmission belts of the V-type, and other relatively flat-type belts which operate in conjunction with pulleys or sprockets and are subject to relatively severe flexing during their operation.

7 Claims, 4 Drawing Figures

INVENTOR.
SIDNEY R. FIX
BY
Henry C. Young Jr.
ATTORNEY

INVENTOR.
SIDNEY R. FIX
BY Henry C. Young Jr.
ATTORNEY

POLYURETHANE BELTS

CROSS-REFERENCE TO RELATED APPLICATION

This application is a continuation-in-part of application Ser. No. 722,917, filed April 22, 1968 now abandoned.

This invention relates to a new composition of matter and a method of its preparation. More particularly, this invention relates to industrial belts and their preparation. This invention particularly relates to flexible polymeric transmission belts of the V type, and other relatively flat-type belts which are designed to contact pulleys or sprockets while performing their driving function as, for example, on a track vehicle.

Polyurethane type polymers are useful for preparing various composite structures. Such composite structures have been used in applications where they are subjected to tension, torsion, compression and shear or combinations thereof. Heretofore, the flexible polyurethane type polymers have been deficient when subjected to various excessive forces and have degraded and failed when subjected thereto. For example, power transmission belts prepared from polyurethane polymers have heretofore been deficient and have failed prematurely under operating conditions. In polyurethane belts of the V type where contact between the sides of the belt and pulley grooves is created by the wedging action so as to resist slippage of the belt in the pulley, such belts have been particularly unsatisfactory in this regard. Similarly, other polyurethane belts of a substantially rectangular cross-section designed for use with track vehicles are subject to the same condition of premature failure due to the relatively severe flexing of the belt during the operation of the vehicle.

Power transmission belts are often used to transfer power from a driving pulley to a driven pulley by passing the belts continuously about the pulleys. Belts formed of a castable synthetic material, such as polyurethane polymers are commercially useful because of properties such as superior wear and abrasion resistance. However, such polyurethane transmission belts are subject to failure due to flexing and excessive abrasion under operating conditions. In a polyurethane V-belt, for example, such failures can take the form of flex cracking and sidewall abrasion of the polyurethane. When the V-belt contains a cord reinforcing element its failure can include cord separation.

It is, therefore, an object of this invention to provide improved polyurethane compositions and a method for their preparation. It is a further object to provide improved power transmission belts, particularly V-belts, and belts for track vehicles which operate in conjunction with pulleys or sprockets, and a method for their preparation.

In accordance with this invention it has been found unexpectedly that an improved polyurethane-type composition comprises a mixture of at least one particulate polyfluorohydrocarbon resin selected from the group consisting of polytetrafluoroethylene and a copolymer of hexafluoropropylene and tetrafluoroethylene and a cured polyurethane prepolymer where the said composition is prepared by a method which comprises mixing the particulate polyfluorohydrocarbon with a liquid polyurethane prepolymer to form a prepolymer mixture, mixing a curing agent with the prepolymer mixture and curing the said prepolymer.

It has been surprisingly found that power transmission belts comprising this polyurethane-type composition, particularly belts of the V-type, have a substantially increased resistance to failure resulting from flexing under operating conditions. Thus, it has further been unexpectedly found that an improved composite structure shaped to define an endless industrial belt is prepared by casting the mixture comprising said prepolymer mixture and curing agent in a mold, curing the prepolymer to form the shaped composite structure and removing the shaped structure from the mold. It is preferred that the said industrial belt has a body portion of a generally trapezoidal cross-section. If desired, the industrial belt can contain a reinforcing tension member which can be formed in the belt by supporting a tension member in the mold cavity prior to casting the mixture of the prepolymer mixture and curing agent in the mold.

Various methods can be used for preparing the polyurethane type of composite structure, such as an industrial belt. Vacuum casting and rotational casting methods can be used and combinations of these methods can be used. For further example of various methods see U. S. Pat. No. 3,200,180.

In the practice of this invention a combination of vacuum and rotational casting methods can be used which comprises (a) applying a reduced pressure to a mold cavity to exhaust gases therefrom; (b) rotating the mold cavity rapidly to create a centrifugal force; (c) casting a predetermined quantity of the said mixture of the polyurethane prepolymer mixture and the curing agent in the mold cavity while simultaneously applying the reduction of pressure and rotating the mold until the mold cavity is filled; and (d) curing the polyurethane prepolymer.

The objects and advantages of this invention may be more readily understood by reference to the drawings.

Figure 1:
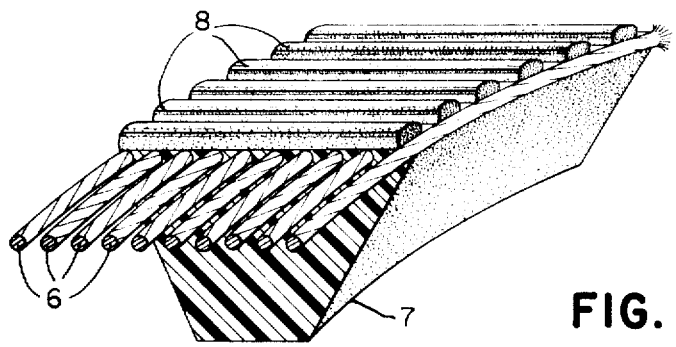
FIG. 1 is a fragmentary perspective view of an endless power transmission V-belt having a body portion of a generally trapezoidal cross-section composed of the polyurethane-type composition of this invention and having tension members embedded therein.

Reference to the drawings shows a circular mold 1 having a molding cavity 2 therein, a charging inlet 3 for charging the mixture comprising a polyurethane prepolymer mixture and curing agent and a transfer cavity 4 for transferring the said mixture from the inlet 3 to the molding cavity 2. The circular mold 1 further has vacuum or reduced pressure venting tubes 5 attached to the mold to remove gases from the molding cavity 2.

A plurality of polyester cable cord tension members 6 were helically wound and positioned against the inner wall of the molding cavity 2. A vacuum, or reduced pressure, was applied to the molding cavity 2 through the venting tubes 5 to exhaust gases therefrom. While maintaining the vacuum, a predetermined amount of a mixture comprising a mixture of particulate polytetrafluoroethylene resin and liquid polyurethane prepolymer and a curing agent was charged through the charging inlet 3 and transfer cavity 4 to fill the molding cavity 2. The polyurethane prepolymer was then cured, with heat if desired, to form the endless belt 7 having a body portion of a generally trapezoidal cross-section, a fragment more clearly shown in FIG. 1. The power transmission belt 7 can be formed, if desired, with a plurality of cross ribs 8 on the top surface of the belt to provide transverse rigidity and flexibility.

Figure 3:
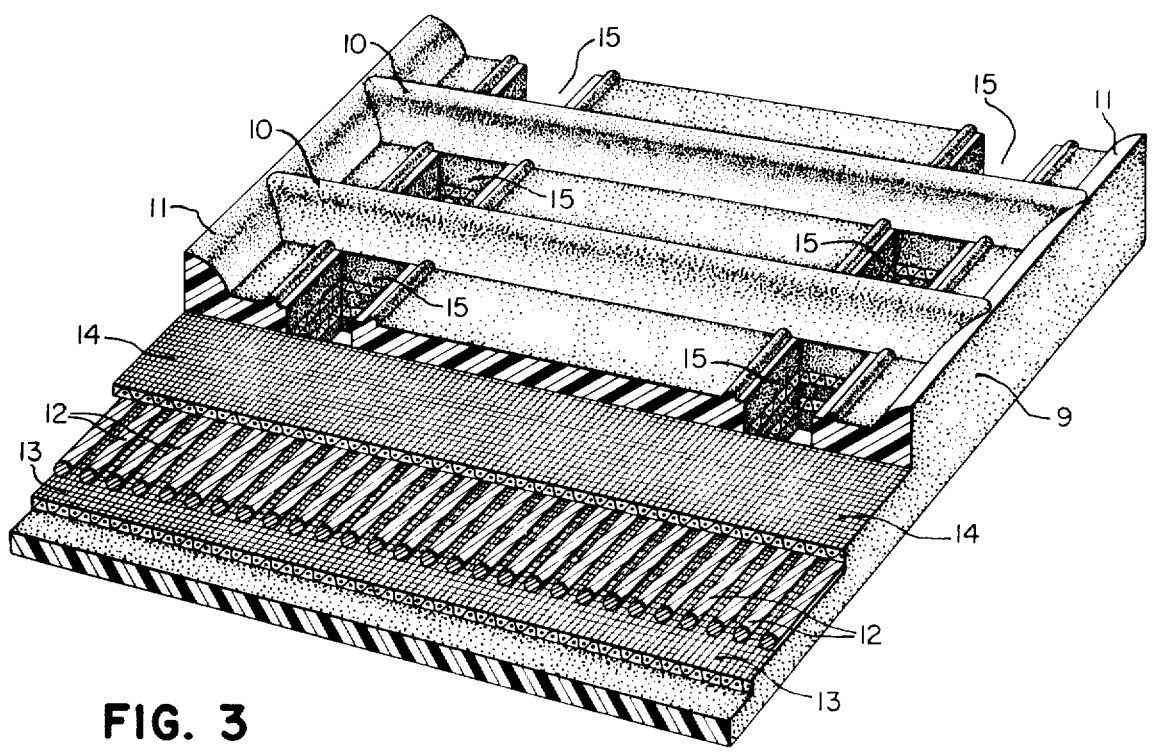
FIG. 3 is a modification of the belt shown in FIG. 1 in which the endless power transmission belt is of a generally rectangular cross-section and designed for use on a track vehicle.

In the modification shown in FIG. 3 the belt 9 has a generally rectangular cross-section, and one surface thereof includes a plurality of transversely extending traction cleats or corrugations 10 which extend between and join raised portions 11 which preferably form a continuous longitudinally extending rib along each lateral edge of the belt 9. The contour of the corrugations 10 and raised portions 11 may be rounded as shown but may also be of a relatively square or rectangular cross-section depending upon the configuration of the particular molding surface used to form the belt 9. The belt 9 is preferably reinforced by longitudinally extending polyester cable cord tension members 12 which are, for example, sandwiched between two layers 13 and 14 of square woven nylon fabric tension members to provide added strength and stability.

Two rows of space openings 15 are provided through the body of the belt between the corrugations 10 to receive sprocket teeth of a vehicle drive during the operation of the vehicle. The openings may be formed during the casting operation or subsequently cut into the body of the belt. Of course, it is to be understood that in some instances, only one row or even more than two rows of openings may be provided depending upon the type of drive being used.

Figure 4:
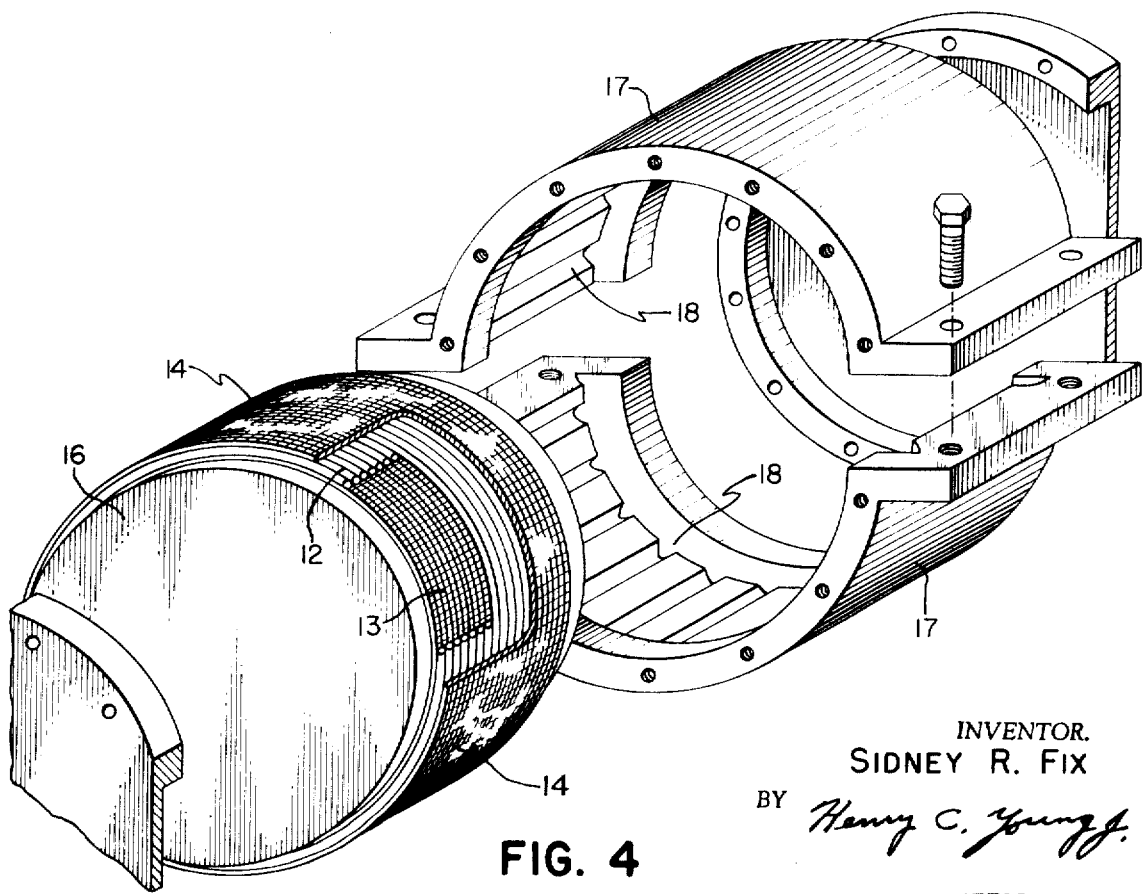
FIG. 4 is a perspective view of a building drum and circular mold used to prepare an endless transmission belt, such as the belt of FIG. 3.

In FIG. 4 the preparation of the belt 9 of FIG. 3 is shown. As illustrated, in order to properly position the textile fabric reinforcement, first each end of the square woven fabric layer 13 was joined together by sewing into a tubular piece and then positioned over a cylindrical building drum 16. The cord tension members 12 were then wound helically over and around the layer 13. Each end of fabric layer 14 was similarly stitched together and the resulting tubular piece was fitted over the layer 13 and cord member 12 assembly. A circular mold 17 containing a molding cavity 18 of the desired configuration was positioned around the building drum 16. Following the same procedure and basic formula as applied in forming belt 7 of FIG. 1, a predetermined amount of a mixture comprising a mixture of particulate polytetrafluoroethylene resin and liquid polyurethane prepolymer and a curing agent was added to the molding cavity 18, thus forming the belt 9.

The belt 9 of FIG. 3 is particularly suitable as a drive belt for a small track vehicle, such as a snowmobile.

Although the power transmission belts of this invention are not required to contain tension members, tension members are preferred for strengthening purposes. Various tension members can be used. Representative examples are cords and textile fabrics, such as square woven fabrics, prepared from polyamides, such as nylon, cellulose and cellulose derivatives, such as cotton and rayon, polyester, glass and wire.

The polyfluorohydrocarbon resins used in this invention are composed essentially wholly of carbon and fluorine and have a very low coefficient of friction, high lubricity and are chemically inert. Although they are generally referred to in this specification as resins, they are flexible at ordinary temperatures, such as about 25° C. and are also flexible over a very wide temperature range. The polyfluorohydrocarbon resins are generally prepared by polymerizing tetrafluoroethylene or copolymerizing tetrafluoroethylene and hexafluoropropylene under pressure in water with a suitable initiator to form very long high molecular weight polymers. They generally have a specific gravity of from about 2 to about 2.3.

The particle size of the particulate polyfluorohydrocarbon resin for this invention is from about 0.1 to about 2,000 microns although it is preferred that the particle size is from about 0.1 to about 200 microns. A more preferable range is from about 0.5 to about 20 microns.

The improved polyurethane composition of this invention is prepared by the step-wise method which comprises forming a prepolymer mixture by mixing from about 0.25 to about 25 parts and preferably from about 2 to about 10 parts by weight of the said polyfluorohydrocarbon resin with 100 parts by weight of the liquid polyurethane prepolymer to obtain a dispersion, and curing the polyurethane prepolymer of the said prepolymer mixture by mixing with a curing agent. It is usually desired to preheat the prepolymer to reduce its viscosity before adding the polyfluorohydrocarbon resin. If necessary, the curing agent is also preheated to melt it if necessary or to reduce its viscosity if desired.

The liquid polyurethane prepolymers used in this invention are prepared by the method which comprises reacting at least one reactive hydrogen-containing polymeric material selected from the group consisting of 1. polyhydroxyl polymers having a molecular weight of from about 750 to about 3,500 selected from polyether polyols, castor oil, hydroxyl terminated linear polymeric polyesters derived from a glycol and an organic dicarboxylic acid, and 2. hydroxyl terminated polymeric polyols having an average molecular weight of from about 1,000 to about 3,500 and an hydroxyl functionality of from about 2 to about 3 with at least one organic polyisocyanate, the overall molar ratio of the isocyanato groups of the polyisocyanate to the reactive hydrogens of the hydrogen-containing polymeric material being between about 1.1/1 and about 12/1.

Various curing agents can be used to cure the polyurethane prepolymer. Representative examples of such curing agents are selected from the group consisting of diamines having primary amino groups, diamines having secondary amino groups, hydrocarbon diols, and hydroxyl amines having primary amino groups, the overall ratio of the amino and hydroxyl groups of the curing agent to the isocyanate groups in excess of the reactive hydrogen groups of the reactive hydrogen-containing polymeric material being from about 0.5/1 to about 1.5/1.

Bifunctional materials, such as glycols and diamines are generally preferred as the curing agents. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols, such as ethylene glycol, 1,3-propane diol, 1,4-butane-diol and glycerol; aliphatic diamines, such as ethylene diamine, trimethylene diamine, and tetramethylene diamine; aromatic diamines, such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine; p-amino-benzyl aniline, and o- and p-aminodiphenyl-amine; hydroxy amines, such as triethanol amine, 2-amino-ethyl alcohol, 2-amino-1-naphthol and m-aminophenyl; hydroxy carboxylic acids, such as glycolic acid and alpha-hydroxy propionic acid; and amino carboxylic acids, such as amino acetic acid and amino benzoic acid. The preferred curing agents are butane diol and the chloroamines, such as ortho-dichlorobenzidine and methylene bis orthochloroaniline.

Polyether polyols useful in preparing the polyurethane of this invention can be prepared by polymerizing or copolymerizing alkylene oxides, such as ethylene oxide, propylene oxide, and butylene oxides, by polymerizing or copolymerizing the low molecular weight glycols, or by the reaction of one or more such alkylene oxides with the glycols or with triol, or with a polycarboxylic acid, such as phthalic acid. The polyether polyols includes polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of hydroxyl terminated linear polymeric polyesters are the condensation products of low molecular weight polyols with an organic polycarboxylic acid or anhydride. Representative low molecular weight polyols are glycols, such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about 1 to 20 per cent by weight of a triol or higher polyfunctional polyol or polyfunctional acid can be present to produce branching in the polyurethane polymer.

It is usually preferred that the hydroxyl terminated polymeric polyol has a molecular weight of from about 2,000 to about 4,000 and a corresponding hydroxyl number of from about 50 to about 25. The hydroxyl terminated polymeric polyols used in this invention are unsaturated polymers of the type prepared by polymerizing unsaturated monomers comprising from about 70 to about 100 per cent conjugated dienes selected from the group consisting of 1,3-butadiene and isoprene and up to about 30 per cent styrene with the aid of organic peroxy catalysts to provide polymers which are generally terminated at both ends of their chain with hydroxyl groups and have an hydroxyl functionality of from about 2 to about 3 and usually from about 2.1 to about 2.8. The preferred hydroxyl containing polymeric polyols are polybutadiene polyols, polyisoprene polyols, and butadiene-styrene copolymer polyols having about 80 to 90 per cent units derived from butadiene and about 20 to 10 per cent units derived from styrene.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methyl-one-bis(cyclohexylisocyanate) and 1,5-tetrahydroanaphthalene diisocyanate, and mixtures of such diisocyanates. For the purposes of the present invention, the toluene-diisocyanates, diphenylmethane-4,4'-diisocyanate and 3,3'-dimethyl-4,4'-bisphenylene diisocyanate are preferred.

In the preparation of the polyurethane prepolymer used in this invention, usually the ratio of isocyanato groups of the polyisocyanate, preferably an organic diisocyanate, to the reactive hydrogen-containing groups of the reactive hydrogen-containing polymeric material is from about 1.1/1 to about 12/1 and preferably about 1.2/1 to about 2.5/1. These materials can be reacted at temperatures from about 20° C. to about 150° C., and preferably from about 20° C. to about 100° C., to form a polyurethane prepolymer. The reactive hydrogens are supplied by hydroxyl groups. This prepolymer can be dissolved or dispersed in a solvent to form a solution or dispersion although it is usually desired not to use a solvent.

Various nonreactive solvents known to those skilled in the polyurethane art can be used for the preparation of the prepolymer solutions if a solvent is desired. Representative examples of the solvents are aromatic solvents, such as benzene, xylene and toluene; and the liquid lower ketones, such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form nonflammable prepolymer mixtures.

It is understood that various additives, fillers, plasticizers and pigments can be added to the prepolymer, such as, for example, di-octyl phthlate, di-octyl sebacate, carbon black, pyrogenic silica and coloring pigments. Usually such additives are added in an amount of from about 0.1 to 20 parts and, generally, in the amount from about 1 to 10 parts per 100 parts of prepolymer by weight.

The polyurethane compositions of this invention are useful, for example, as power transmission belts, such as flat or V-type belts. They are particularly useful as V-type belts designed to operate with a standard sheave having a 36° angle groove or with a 60° wide angle sheave and also may be used with a 28° angle sheave of a variable speed system.

The polyurethane compositions of this invention are also useful for such power transmission belts designed for use as drive belts for track vehicles. With special regard to the polyurethane compositions for belts used on track vehicles, such as snowmobiles, fillers such as walnut shells or other well-known tractionizers may be desirable as traction aids when the snowmobile vehicles are being operated over icy surfaces.

The following examples further illustrate the objects and advantages of this invention. The parts and percentages are by weight unless otherwise indicated.

EXAMPLE I

Figure 2:
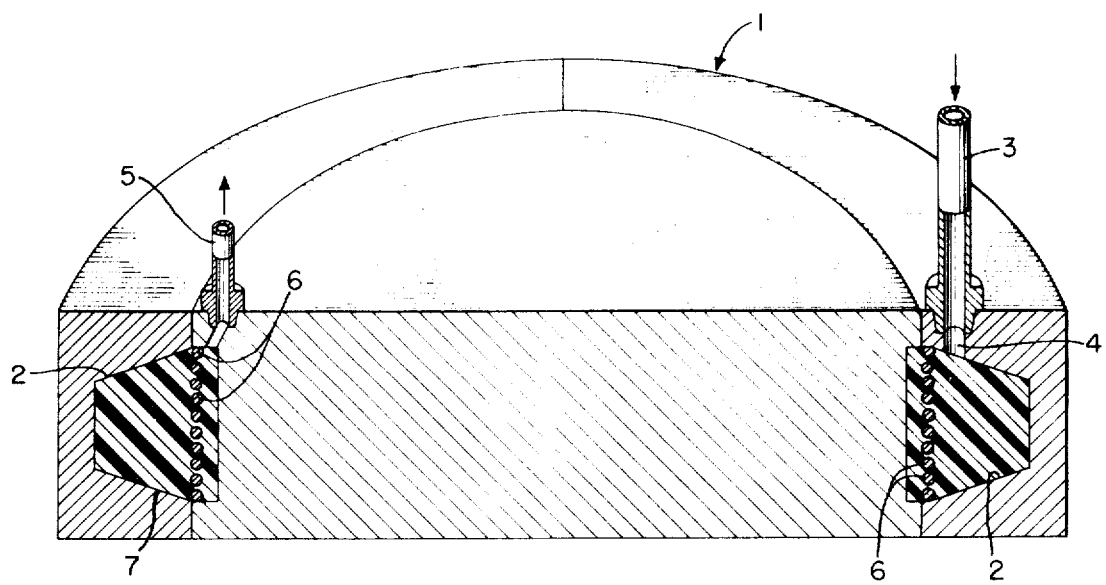
FIG. 2 is a perspective view of a circular mold used to prepare an endless power transmission belt, such as the V-type belt shown in FIG. 1 shown more clearly by the cut-away portion.

A metal mold similar to the type shown in FIG. 2 was prepared. A polyester cable having a diameter of about 0.04 inches composed of individual twisted filaments was helically wound around the inner surface of the mold in a manner generally shown by FIG. 2. The mold was preheated to about 120° C. A vacuum of about 5 millimeters of mercury pressure was applied to the molding cavity to exhaust gases therefrom. While maintaining the vacuum, a predetermined amount of a mixture of a liquid polyurethane prepolymer and a curing agent was charged to the molding cavity. The prepolymer was cured at about 180° C. for about 3 hours to form an endless V-type power transmission belt having a body portion of generally a trapezoidal cross-section similar to FIG. 1. The prepared belt was removed from the mold and turned inside out. The belt had a length of about 43 inches, an angle of about 40°, a top width of about 5/16 inches and a top to bottom thickness of about 13/64 inches.

Nine of such power transmission belts were prepared by this method, using the same prepolymer and curing agent, and are labeled A through I, except that a particulate polytetrafluoroethylene having an average particle size of from about 0.5 to about 1.0 microns was mixed with and dispersed in the liquid prepolymer before adding the curing agent for the preparation of belts F through I. Belts A through E were not prepared with the particulate polytetrafluoroethylene.

In this example, the polyurethane prepolymer was prepared with the following formulation:

| Compound | Parts |
| --- | --- |
| Prepolymer of polytetramethylene ether glycol and tolylene diisocyanate having about a 6.2 to about a 6.5 percent isocyanate content[1] | 100.0 |
| Polytetrafluoroethylene (For belts F through I)[2] | 5.0 |
| Methylene-bis-orthochloroaniline curative (Belts A through E) | 19.8 |
| Methylene-bis-orthochloroaniline curative (Belts F through I) | 19.5 |

1. Obtained at L-167 from E. I. duPont deNemours & Co, Inc.

2. Obtained as Teflon WC-6 from The Whitford Chemical Corporation

The prepolymer was heated to about 75° C. to 80° C. and degassed under reduced pressure. For the preparation of belts F through I, the particulate polytetrafluoroethylene was mixed with the prepolymer before heating and degassing.

The curative was melted by heating to about 110° C. to 120° C. and mixed with the liquid prepolymer before casting. This mixture was then cast according to the method of this Example to form the power transmission belts A through I.

The power transmission V-type belts A through I were dynamically tested according to SAE procedure J–637 (SAE Handbook, 1967 Edition) where the belts were tested at 12.5 horsepower on a three-pulley arrangement consisting of a drive, a driven and an idler pulley except that the pulley used for the idler was a dummy generator pulley 2 inches in diameter instead of 3 inches to increase the severity of the test. The belts were tested to failure and the lapsed time of the test of each belt to failure is shown in Table A. The failure of a belt was indicated by torn belt, surface cracks in the belt, cord separation, broken cord, or broken cross ribs.

TABLE A

| Belt: | Condition of bolt at failure | Time to failure (hours) |
| --- | --- | --- |
| A | Severe abrasion on side wall | 63 |
| B | Wear on side wall | 69 |
| C | Severe abrasion on side wall, cord separation | 39 |
| D | Wear and abrasion on side wall and in bottom portion of belt | 69 |
| E | Broken cross rib ends, abrasion on side wall, torn belt | 61 |
| Average | | 60 |
| F | Broken edge cord, abrasion on side wall, cracks in bottom portion of belt | 672 |
| G | Cracked cording ribs on top of belt, broken cross rib ends, borken belt | 903 |
| H | Surface cracking on bottom side of belt | 171 |
| I | Abrasion on side wall, cracks in bottom portion of belt | 511 |
| Average | | 564 |

As shown by the data in Table A the belts F through I composed of the mixture of particulate polytetrafluoroethylene and cured polyurethane prepolymer prepared according to this invention possessed a substantial increase in resistance to failure under dynamic test.

In the practice of this invention various well-known catalysts or accelerators can be mixed with the prepolymer to increase the rate of curing of the prepolymer. Representative are the various tin catalysts and mercaptobenzothiazole. Usually the polyurethane prepolymers are cured at temperatures of from about 50° C. to about 200° C. although lower temperatures can be used if an accelerator is present, such as from about 20°C. to about 100° C.

EXAMPLE II

A metal mold assembly similar to the type shown in FIG. 4 was prepared. A square woven nylon textile fabric was formed into a tubular piece by sewing its ends together. The tubular fabric piece was then slipped over a cylindrical metal building drum of the type shown in FIG. 4 to form a first fabric layer. A polyester cable having a diameter of about 0.05 inch composed of individual twisted filaments was helically wound around the first fabric layer. A second fabric layer was also formed into a tubular piece by sewing its ends together and was positioned over the first layer and cord assembly to form the tension members of the belt. Each warp and filling cord of the square woven nylon fabric layers had a gauge of about 0.034 of an inch, a count of 25.0 ends per inch, a single yarn number of 840/2 with a twist construction in turns per inch of 12.0Z/12.0.

A circular metal mold with the desired molding cavity similar to the type shown in FIG. 4 was then positioned around the building drum and tension members. The mold was preheated to about 95° C. a vacuum of about 5 millimeters of mercury pressure was applied to the molding cavity to exhaust gases therefrom. While maintaining the vacuum, a predetermined amount of a mixture of a liquid polyurethane and a curing agent was charged to the molding cavity. The prepolymer was cured at about 155° C. for about 3 hours to form an endless belt track similar to FIG. 3 having a body portion of generally a rectangular cross-section with a plurality of transversely extending corrugations in one surface thereof. The belt was removed from the mold, and two rows of spaced openings were formed in the body of the belt between the corrugations by means of a square die punch. These spaced openings receive sprocket teeth of a vehicle drive during the operation of the vehicle. The belt had a length of about 114 inches, a width of about 15½ inches, and the thickness of each corrugation was about one-fourth of an inch.

Three such belts of the type designed for use on track vehicles were prepared by this method using the same prepolymer and curing agent. The polyurethane prepolymer was prepared comprising the following formulation:

| Compound | Parts |
| --- | --- |
| Prepolymer of polytetramethylene ether glycol and tolylene diisocyanate having about a 6.2 to about a 6.5 percent isocyanate content[1] | 100.0 |
| Polytetrafluoroethylene[2] | 5.0 |
| Methylene-bis-orthochloroaniline curative | 19.5 |

1. Obtained as L-167 from E. I. duPont deNemours & Co., Inc.

2. Obtained as Teflon WC-6 from The Whitford Chemical Corporation

The prepolymer was mixed with 20 parts of di-octyl sebacate, heated to about 75° C. to 80° C., and degassed under reduced pressure. The particulate polytetrafluoroethylene having an average particle size of from about 0.5 to about 1.0 microns was mixed with the prepolymer before heating and degassing.

The curative was melted by heating to about 110° C. to 120° C. and mixed with the liquid prepolymer before casting. This mixture was then cast according to the method of this example to form the three belts designed for use on a track vehicle, such as a snowmobile.

One of the belts was mounted on a 23-horsepower, AMF Super Scout Mark III snowmobile vehicle and tested under actual operating conditions. The tests were conducted for a total of 12½ hours on 6 separate days. On these days the outside temperature ranged from about −20° C. to about 0° C. and the depth of snow cover was from about 8 to about 10 inches. During these tests the snowmobile, including the belt track formed of the composition of this invention, was driven over snow and ice-covered surfaces, much of which included extremely rough and broken terrain. The vehicle was operated at speeds up to about 35 mph and its operation included many rapid accelerations from 0 to about 35 mph.

The belt track was observed to exhibit good gripping or tractive power, both on straightaways and during turns, which compared very favorably to that of conventional rubber tracks and exceeded that of polyurethane tracks formed without a polyfluorohydrocarbon resin in their formulations. In addition, no snow buildup was observed on the belt track of the kind which commonly occurs on conventional rubber or polyurethane tracks. At the conclusion of the tests the belt track remained in good operating condition and capable of further operation.

While certain representative embodiments and details have been shown for the purpose of illustrating the invention, it will be apparent to those skilled in the art that various changes and modifications may be made therein without departing from the spirit or scope of the invention.

What is claimed is:

1. An endless industrial belt formed of a composition comprising a mixture of at least one particulate polyfluorohydrocarbon resin and a cured polyurethane prepolymer where said resin is selected from the group consisting of polytetrafluoroethylene and a copolymer of hexafluoropropylene and tetrafluoroethylene and wherein said composition is prepared by the method which comprises:

A. forming a prepolymer mixture by mixing from about 0.25 to about 25 parts by weight of the said polyfluorohydrocarbon resin with 100 parts by weight of a liquid polyurethane prepolymer prepared by the method comprising:

1. reacting at least one reactive hydrogen-containing polymeric material selected from the group consisting of:
      a. polyhydroxyl polymers having a molecular weight of from about 750 to about 3,500 selected from polyether polyols, castor oil, hydroxyl terminated linear polymeric polyesters derived from a glycol and an organic dicarboxylic acid, and
      b. hydroxyl-terminated polymeric polyols having an average molecular weight of from about 1,000 to about 3,500 and an hydroxyl functionality of from about 2 to about 3, and 2. at least one organic polyisocyanate, the overall molar ratio of the isocyanato groups of the polyisocyanate to the reactive hydrogens of the hydrogen-containing polymeric material being between about 1.1/1 and about 12/1; and B. curing the polyurethane prepolymer of the said prepolymer mixture by mixing with a curing agent selected from the group consisting of diamines having primary amino groups, diamines having secondary amino groups, hydrocarbon diols, and hydroxyl amines having primary amino groups, the overall ratio of the amino and hydroxyl groups of the curing agent to the isocyanato groups in excess of the reactive hydrogen groups of the reactive hydrogen-containing polymeric material being from about 0.5/1 to about 1.5/1.

2. The industrial belt of claim 1 having a body portion of a generally trapezoidal cross-section.

3. The industrial belt of claim 1 wherein the belt contains a reinforcing tension member extending generally longitudinally of the belt and composed of material selected from at least one of the group consisting of cotton, nylon, rayon, polyester, wire and glass.

4. The industrial belt as claimed in claim 1 wherein the polyfluorohydrocarbon resin is polytetrafluoroethylene having a particle size of from about 0.1 to about 2,000 microns; the reactive hydrogen-containing polymeric material is selected from the group consisting of polyether glycols and hydroxyl terminated linear polymeric polyesters; and polyisocyanate is selected from the group consisting of the toluene diisocyanates, diphenylmethane-4,4'-diisocyanate and 3,3'-dimethyl-4,4'-bis-phenylene diisocyanate; and the curing agent is a diamine selected from the group consisting of orthodichlorobenzidine and methylene-bis-orthochloroaniline.

5. The industrial belt as claimed in claim 4 wherein the reactive hydrogen-containing polymeric material is polytetramethylene ether glycol, the polyisocyanate is toluene diisocyanate and the curing agent is methylene-bis-orthochloroaniline.

6. The industrial belt as claimed in claim 1 having a generally rectangular cross-section with one surface thereof including a plurality of corrugations extending transversely of the belt.

7. The industrial belt of claim 6 wherein the belt includes at least one row of spaced openings therein between said corrugations.

* * * * *